April 10, 1956          E. GROSS          2,741,144
DRILLING ATTACHMENT
Filed July 17, 1953

INVENTOR.
EDWARD GROSS
BY
Bean, Brooks, Buckley & Bean
ATTORNEYS

United States Patent Office 2,741,144
Patented Apr. 10, 1956

2,741,144

DRILLING ATTACHMENT

Edward Gross, Eggertsville, N. Y.

Application July 17, 1953, Serial No. 368,729

8 Claims. (Cl. 77—5)

My invention relates in general to drilling attachments, and in particular to an attachment for drilling holes in small workpieces.

It is well known to those skilled in the art that in drilling small sized holes in the workpieces, a drill head is used which rotates the drill and at the same time feeds it into the work to a predetermined depth at which time the electric circuit energizing the drill head is broken, the drill is stopped and the spindle is actuated to withdraw the drill from the hole. This operation is usually accomplished by the actuation of a foot lever which becomes very tiresome to the operator after continued use. In such an arrangement, the workpiece is fed to a jig supplied with air under pressure which causes the workpiece to be ejected from the jig when released by the operator after the hole is finished.

It is the principal object of my invention to provide an attachment using the source of air pressure of the present setup to automatically actuate the drill whenever a workpiece is seated within the jig.

Another object is to provide a pressure-actuated switch which is inserted in the electric circuit supplying current to the drill head.

It is a further object to provide a signal light connected in the electric circuit supplying current to the drill head, whereby the workpiece may be initially checked by the operator before it is removed from the jig, thereby.

Moreover, my device is so designed that the drill head will not be energized before the workpiece has reached its final position within the jig.

Furthermore, it is an object to provide means, whereby the hole when properly drilled in the workpiece, will provide a bleeder opening for reducing the air pressure and thereby deenergizing the drill head and the signal light.

The above objects and advantages have been accomplished by the device shown in the accompanying drawings, of which:

Figure 1:
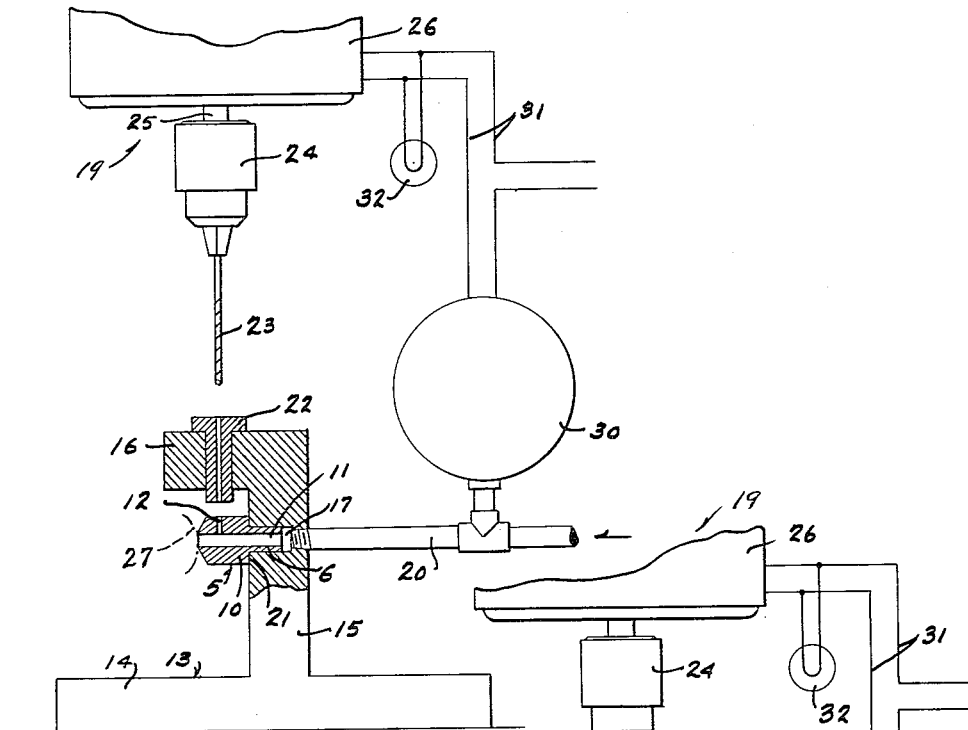
Fig. 1 is a side elevation, somewhat schematic of my invention.

Referring to the form of invention shown in Fig. 1, 5 represents the workpiece which is formed with a stem 6 and a head 10. The head and stem are provided with a continuous longitudinal passageway 11 open at both ends of the workpiece. The aperture which has been drilled in the workpiece is shown at 12.

The jig which is represented at 13 is formed with a base 14 and an upstanding portion 15 having a lateral leg 16 at its upper end. The upstanding portion 15 is provided with a jig aperture 17 which is supplied with air under pressure through an air supply line 20, suitably secured to the jig. The aperture 17 of the jig is sized to fit the stem 6 of the workpiece so that when inserted into the jig aperture, the flow of air therethrough will be cut off when the hole of the stem is closed during the drilling operation. As shown in Fig. 1, the stem is considerably smaller in diameter than the head 10 whereby a shoulder 21 is formed, which is brought to bear against the face of the upstanding portion before the hole is drilled. A drill bushing 22 is carried by the lateral leg 16 for guiding the drill 23 as it enters the workpiece.

The drill 23 is carried by a drill head 19 comprising a suitable drill chuck 24 mounted upon the spindle 25 of an electric motor 26. As hereinbefore pointed out, this motor is of the type which, when energized, will rotate the drill and feed it toward and into the workpiece. After the hole is drilled to the predetermined depth, the drill is automatically withdrawn from the workpiece, and the rotation of the spindle is stopped.

When a workpiece like that shown in Fig. 1 is being operated on, it is necessary that the passageway 11 formed therein be closed after the workpiece has been supported by the jig and moved to drill-engaging position thereon. This may be accomplished by the use of the operator's finger as indicated at 27 by the dot and dash line or suitable shutter means (not shown) may be provided for closing the passageway. This passageway is normally open while the workpiece is being assembled in the jig thereby allowing the air to escape therethrough and thus maintaining a low pressure of air in the supply line 20. When, however, the opening 11 of the workpiece is closed by the finger of the operator or by any other suitable means, pressure is built up in the air line and in the pressure-actuated electric switch 30 connected therein. When pressure builds up in the air line, the electrical contacts (not shown) of the pressure-actuated switch are closed, thereby energizing the electric motor 26 of the drill head 19 through circuit 31. A signal light 32 is connected in this circuit which will be illuminated whenever the air in the supply line 20 is above normal pressure. This condition exists when the workpiece is in position for drilling with its passageway closed, when the hole has not been drilled in the workpiece to the full depth, or when a drill has been broken off in the workpiece, thus failing to provide a bleeder opening. When, however, the hole has been completely drilled as indicated by the deenergizing drill head and signal light, the air in the supply line will cause the workpiece to be ejected from the jig opening 17 when it is released by the operator.

Figures 2, 3:
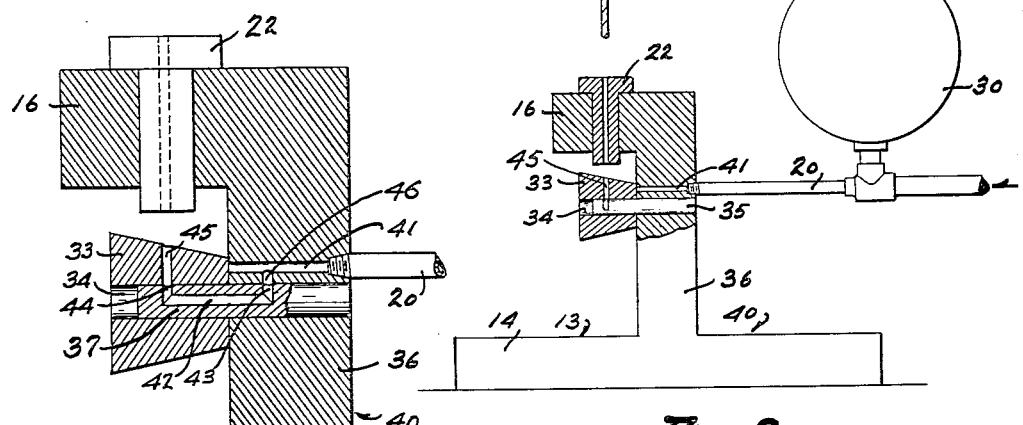
Fig. 2 is a modified form of the same.
Fig. 3 shows an enlarged fragmentary view of my invention as applied to the drilling of a workpiece similar to that of Fig. 2.

In Fig. 2, my invention is shown designed for use upon a different type of workpiece. In this form of my invention the workpiece 33 is not provided with a stem but has an opening 34 which extends clear through opening into opposite faces thereof. In order to hold this workpiece in position, a jig pin 35 is provided which is carried by the upstanding portion 36 of the jig 40. This pin extends beyond the working face of the upstanding portion a sufficient distance to properly support the workpiece when in this position. In this form of device the jig orifice 41 is formed through the upstanding portion 36 of the jig and opens into the working face thereof at such position where it will be covered by the workpiece when it has been moved thereon to drill-engaging position. In this form the signal light 32 will indicate when the workpiece is in proper drilling position upon the pin 35 by the closing off of the jig aperture 41.

In the form of invention shown in Fig. 3, the device is designed to drill a workpiece similar to that of Fig. 2 but where it is desired that the drill hole provide a bleeder opening as in the form of Fig. 1. As shown, the pin 37 is formed with a longitudinal passageway 42 closed at both ends but in communication with one end to the jig passageway 41, by means of a lateral aperture 43, and a registering aperture 46 formed in the jig, and at the opposite end with the drilled hole 45 of the workpiece by means of a lateral aperture 44.

In the type of apparatus shown in Fig. 3, the insertion of a workpiece upon the jig pin 37 will first cut off the passage of air through the jig bleeder passageway 42 and lateral aperture 44 but will allow air to flow from the jig orifice 41 until such time as the workpiece has been moved upon the jig pin to its final drill-engaging position. When so positioned escape of air through the jig aperture 41 will also be cut off, and air pressure will be built up in the supply line 29, thereby operating the pressure-actuated switch 30 to energize the motor 26 of the drill head and to illuminate the signal light. When the hole 45 is completely drilled through the workpiece, it will be brought into communication with the lateral opening 44 of the jig pin and with the communicating jig passageway 42. The drill is now automatically withdrawn from the drilled hole thereby providing a bleeder opening for the air which reduces the pressure within the line 29 and deenergizing the motor 26 and the signal light. Upon release of the properly drilled workpiece, air coming through the jig orifice 41 will serve to eject the workpiece from the jig. However, if a bleeder opening is not provided by the completely drilled hole, or if the drill breaks off and lodges in the hole, the pressure will, therefore, be maintained in the switch element 30, and the signal light will remain illuminated to indicate that the workpiece just drilled is imperfect; and, as a result of such detection the imperfect workpiece may be removed from the jig and discarded.

From the foregoing it will be obvious that small workpieces may be readily pierced with small sized openings without the use of foot actuated pedals, which not only relieves the fatigue accompanying the actuation of such pedaling, but reduces the drilling time as well. Furthermore, the number of imperfectly drilled workpieces and the number of broken drills is greatly reduced because the drill is not brought to the workpiece until it has been brought to drill-engaging position. Furthermore, since each workpiece is automatically checked by means of the signal light before being ejected from the jig, the need for subsequent inspection is eliminated.

What is claimed is:

1. An attachment for drilling a hole in a workpiece, comprising a jig for receiving and supporting the workpiece, the jig being formed with an aperture closable by the workpiece when in its drill-receiving position, a source of air under pressure in communication with the aperture of the jig, a drill head, a source of electricity for actuating the drill head, and a pressure-actuated electric switch connecting the source of air supply and the source of electricity, the drilled hole being in communication with the aperture of the jig, whereby the drilled hole provides a bleeder opening to reduce the air pressure in the pressure-actuated switch.

2. A drilling attachment, comprising a jig having an aperture in communication with a source of air supply and normally open to the atmosphere, a workpiece mountable upon the jig and so positioned as to close the aperture thereof and thereby increase the air pressure, means controlled by such increased pressure for actuating a drill to drill the workpiece, the drilled hole when finished being in communication with the air source to provide a bleeder opening to reduce the air pressure, whereby the drilled hole provides a bleeder opening to reduce the air pressure in the pressure-actuated switch.

3. A drilling attachment, comprising a jig having an aperture in communication with a source of air supply and normally open to the atmosphere, a workpiece insertable into the jig aperture for closing the aperture and increasing the air pressure, and means controlled by such increased pressure for actuating a drill to drill the workpiece, the drilled hole when finished being in communication with the air source to provide a bleeder opening to reduce the air pressure, whereby the drilled hole provides a bleeder opening to reduce the air pressure in the pressure-actuated switch.

4. A drilling attachment, comprising a jig having an aperture in communication with a source of air supply and normally open to the atmosphere, an apertured workpiece insertable in the aperture of the jig, means for closing the workpiece aperture during the drilling operation to increase the air pressure in the jig aperture, and means controlled by such increased pressure for actuating a drill to drill the workpiece, the drilled hole when finished being in communication with the air source to provide a bleeder opening to reduce the air pressure, whereby the drilled hole provides a bleeder opening to reduce the air pressure in the pressure-actuated switch.

5. A drilling attachment, comprising a jig having an aperture in communication with a source of air supply and normally open to the atmosphere, an apertured workpiece insertable in the aperture of the jig, means for closing the workpiece aperture during the drilling operation to increase the air pressure in the jig aperture, a signal light, power means controlled by such increased pressure for actuating a drill to drill the workpiece and to energize said signal light, the drilled hole when finished being in communication with the air source to provide a bleeder opening to reduce the air pressure, whereby the signal light will be deenergized.

6. An attachment for drilling a hole in a workpiece, comprising a jig for receiving and supporting the workpiece, the jig being formed with an aperture closable by the workpiece when in its drill-receiving position, a source of air under pressure in communication with the aperture of the jig, a drill head, a source of electricity for actuating the drill head, a pressure-actuated electric switch connecting the source of air supply and the source of electricity, and a signal light controlled by the pressure-actuated switch, the drilled hole being in communication with the aperture of the jig, whereby the drilled hole provides a bleeder opening to reduce the air pressure in the pressure-actuated switch, thereby deenergising the light.

7. A drilling attachment, comprising a jig having a workpiece support, said jig having an aperture in communication with a source of air under pressure and normally open to the atmosphere, the aperture being closed by the workpiece when properly mounted upon the work support thereby increasing said air pressure, means controlled by said increased pressure for actuating a drill to drill the workpiece, manual means for holding the workpiece in position on said work support against the air pressure while the hole is being drilled, said increased pressure serving to eject the workpiece from said work support when the drilling operation is completed and the holding means is released.

8. A drilling attachment, comprising a jig having a workpiece support, said jig having an aperture in communication with a source of air under pressure and normally open to the atmosphere, the aperture being closed by the workpiece when properly mounted upon the work support to increase said air pressure, power means controlled by said increased pressure for actuating a drill to drill the workpiece, a signal light, a source of electricity for actuating said power means and for energising said light, a pressure-actuated electric switch connecting the source of air supply with said source of electricity, and manual means for holding the workpiece in position on said work support against the air pressure while the hole is being drilled, the drilled hole being in communication with the jig aperture to form a bleeder opening to reduce said pressure and to deenergise said signal light, said air pressure serving to eject the workpiece from said work support when the drilling operation is completed and the holding means is released.

References Cited in the file of this patent
UNITED STATES PATENTS 2,625,061   Mansfield _____ Jan. 13, 1953